United States Patent [19]

Hara et al.

[11] 4,251,824
[45] Feb. 17, 1981

[54] LIQUID JET RECORDING METHOD WITH VARIABLE THERMAL VISCOSITY MODULATION

[75] Inventors: Toshitami Hara, Tokyo; Yasushi Sato, Kawasaki; Yasushi Takatori, Machida; Yoshiaki Shirato, Yokohama, all of Japan

[73] Assignee: Canon Kabushiki Kaisha, Tokyo, Japan

[21] Appl. No.: 93,851

[22] Filed: Nov. 13, 1979

[30] Foreign Application Priority Data

Nov. 14, 1978 [JP] Japan .................................. 53-139980
Nov. 28, 1978 [JP] Japan .................................. 53-146734
Nov. 28, 1978 [JP] Japan .................................. 53-146735

[51] Int. Cl.³ .......................................... G01D 15/18
[52] U.S. Cl. ................................. 346/140 R; 346/1.1
[58] Field of Search ......................... 346/1.1, 140 R

[56] References Cited
U.S. PATENT DOCUMENTS

| 3,308,475 | 3/1967 | Bean ..................................... 346/140 R |
| 3,480,962 | 11/1969 | Weigl et al. ............................ 346/1.1 |
| 3,553,708 | 1/1971 | Carreira et al. ............. 346/140 R X |
| 3,790,703 | 2/1974 | Carley .......................... 346/140 R X |
| 4,164,745 | 8/1979 | Cielo et al. .................. 346/140 R X |

Primary Examiner—George H. Miller, Jr.
Attorney, Agent, or Firm—Fitzpatrick, Cella, Harper & Scinto

[57] ABSTRACT

A liquid jet recording method, which includes controlling thermal energy quantity to be generated by driving predetermined numbers of heat generating bodies selected in accordance with recording information from a plurality of heat generating bodies which disposed along a flow path in a liquid chamber communicatively connected with a discharge orifice for discharging and spattering liquid droplets in a predetermined direction, and each being driven independently of the other; causing the thus controlled thermal energy to act on the liquid in the liquid chamber to bring about instantaneous change in the state of the liquid to develop foams; and discharging and spattering the liquid droplets from the discharge orifice for recording.

8 Claims, 18 Drawing Figures

LIQUID JET RECORDING METHOD WITH VARIABLE THERMAL VISCOSITY MODULATION

BACKGROUND OF THE INVENTION

1. Field of the Invention

This invention relates to an improvement in a liquid jet recording method, wherein thermal energy is acted upon recording liquid filled in a liquid chamber which communicates with a discharge orifice to thereby discharge the liquid droplets through the orifice, and the thus discharged droplets are adhered onto the surface of a recording member such as paper, etc. by spattering the same.

2. Description of the Prior Art

Non-impact recording method has drawn attention of all concerned owing to its extremely low and negligible noise at the time of recording operation. Of various kinds of the non-impact recording methods, the so-called ink-jet recording method (or liquid jet recording method) capable of performing high speed recording without necessity for any special image fixing treatment to be effected on the so-called plane paper is the extremely efficacious recording method. In view of such effectiveness in this ink-jet recording method, there have so far been devised and proposed various systems as well as devices to put the method into practice. Of these methods and devices, some have already been improved satisfactorily to be commercialized, and others are still being under development for practical use.

The liquid jet recording method disclosed in U.S. patent application No. 948,236 (corresponding to laid-open German patent application No. P2843064) possesses characteristics different from other liquid jet recording methods in that thermal energy is caused to act on the liquid to obtain power to discharge the liquid droplets. In more detail, the recording method as disclosed in this application is characterised in that the liquid which has been subjected to action of thermal energy brings about change in its state which is accompanied by abrupt increase in its volume, and, by this force of action based on the change in the state of liquid, droplets are discharged and spattered from the orifice at the tip end of the recording head and adhered onto the recording member for recording the informations. This method is further characterized in that it can be effectively utilized in the so-called "drop-on demand" recording method, and the recording head can be easily constructed in the form of a full-line type, high density multi-orifice structure, hence on image of high image resolution and quality can be obtained at a high speed.

Thus, while the abovementioned liquid jet recording method has various excellent characteristics, there still remain some room for improvement in respect of recording an image of high image resolution and quality at a faster operating speed, and of recording an image having tonality with better repreducibility.

SUMMARY OF THE INVENTION

It is therefore a primary object of the present invention to provide an improved liquid jet recording method free from the abovementioned disadvantages.

It is another object of the present invention to provide an improved liquid jet recording method capable of recording an image of high image resolution and quality at a constantly stable, high operating speed.

It is still another object of the present invention to provide an improved liquid jet recording method capable of recording an image having tonality with better reproducibility.

According to the present invention, in one aspect thereof, there is provided an improved liquid jet recording method, which comprises controlling thermal energy quantity generated by driving predetermined numbers of heat generating bodies selected in accordance with an input signal from a plurality of heat generating bodies provided along a flow path in a liquid chamber communicatively connected with a discharge orifice for discharging and spattering liquid droplets in a predetermined direction, and each being driven independently each other, causing the thus controlled thermal energy to act on the liquid in the liquid chamber to bring about instantaneous change in the state of the liquid to develop foams, and discharging and spattering the liquid droplets for recording.

According to the present invention in another aspect thereof, there is provided a liquid jet recording method, which comprises: introducing an input signal, the energy level of which has been selected in accordance with recording information into at least one heat generating body provided along a flow path in a liquid chamber communicatively connected with a discharge orifice for discharging and spattering liquid droplets in a predetermined direction; controlling thermal energy quantity generated from the heat generating body; causing the thus controlled thermal energy to heat the liquid in the liquid chamber to bring about instantaneous change in the state of the liquid to develop foams; and discharging and spattering the liquid droplets from the discharge orifice for recording.

According to still another aspect of the present invention, there is provided a liquid jet recording method, which comprises: controlling thermal energy quantity to be generated by driving one heat generating body selected in accordance with recording information from a plurality of heat generating bodies which are arranged along flow path in a liquid chamber communicatively connected with a discharge orifice for discharging and spattering liquid droplets in a predetermined direction, and each being driven independently of the other; causing the thus controlled thermal energy to act on the liquid in the liquid chamber to bring about instantaneous change in the state of the liquid to develop foams; and discharging and spattering the liquid droplets from the discharge orifice for recording.

According to other object of the present invention, there is provided a liquid jet recording method, which comprises: causing thermal energy generated by driving a plurality of heat generating bodies which are arranged along flow path in a liquid chamber communicatively connected with a discharge orifice for discharging and spattering liquid droplets in a predetermined direction, and each being driven independently of the other, in the sequence of the innermost part of the flow path to bring about instantaneous change in the state of the liquid to develop foams; and discharging and spattering the liquid droplets from the discharge orifice for recording.

BRIEF DESCRIPTION OF THE DRAWING

FIGS. 7A and 7B are respectively diagrammatic perspective view and a plan view showing another embodiment of the device to realize the method of the present invention, in which FIG. 7A is an assembly diagram, and FIG. 7B is a plan view of a grooved plate 704;

FIGS. 10A, 10B and 10C are diagrammatic explanatory views of still other device to realize the present invention, in which FIG. 10A is a perspective view of the recording head of the device, FIG. 10B is a perspective view of a heat generating base plate 1007 for explaining a pattern of the heat generating body, and FIG. 10C is a cross-sectional view for explaining the structure of the heat generating body;

DESCRIPTION OF THE PREFERRED EMBODIMENTS

Figure 1:
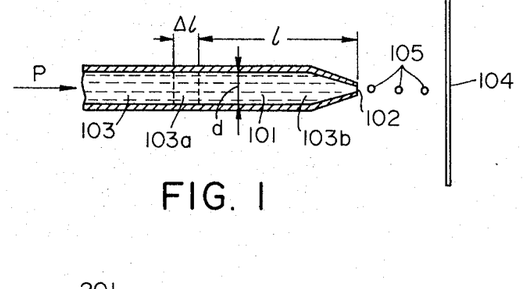
FIG. 1 is a schematic side view in longitudinal cross-section for explaining the principle of recording by the liquid jet recording method according to the present invention.

Referring to FIG. 1, recording liquid 103 is fed in a liquid chamber 101 $(1+\Delta l)$ which constitutes the recording head and the tip end of which is formed in a nozzle shape. To this liquid, a pressure P at a level that does not cause the liquid to be discharged from the orifice 102 is applied by an appropriate pressure applying means such as a pump, etc., or hydrostatic pressure. Now, when this recording liquid at a distance of $1+\Delta l$ from the orifice 102 is subjected to the action of heat energy from a very small heat generating member (not shown) at its portion of a width $\Delta l$, a change in the state of liquid occurs at a portion 103a of the recording liquid adjacent the heat generating body to develop foams therein. As the result, a pressure within the liquid chamber having the width $\Delta l$ increases, and a part of the recording liquid 103b present in the portion of the width 1 is discharged from the orifice 102 to be spattered toward the recording member 104, and adheres onto a predetermined position on the recording member 104. When heat generation from the heat generating body stops, there is fed the recording liquid into the liquid chamber 101 for the portion depleted by the discharge. In the recording method based on this principle, thermal energy is acted onto the recording liquid in a time discontinuing manner, thereby enabling this acting thermal energy to carry the recording informations. In other words, by pulsive heat generation from the heat generating body in accordance with the recording information signals, it is possible to bring about change in the state of the recording liquid at a portion $\Delta l$ to develop foams, and to cause any of the liquid droplets 105 which are discharged from the orifice 102 due to the foams as generated to carry the recording information thereon.

The size of the droplets 105 of the recording liquid which are discharged and spattered from the orifice 102 depends upon the amount of acting thermal energy, the magnitude of the width $\Delta l$ of the portion 103a of the recording liquid in the nozzle directly subjected to the action of the thermal energy, the inner diameter d of the nozzle, the distance 1 from the position of the orifice 102 to the position of the portion $\Delta l$ to be subjected to the action of the thermal energy, the pressure P to be applied to the recording liquid, and the specific heat, heat conductivity, the thermal expansion coefficient, etc. of the recording liquid.

The present invention is a further improvement in the liquid jet recording method, wherein the recording operation is effected by discharging the liquid droplets based on such principle.

In the following, the present invention will be explained in reference to a preferred embodiment shown in FIG. 2A, et seq.

Figures 2A, 2B, 3:
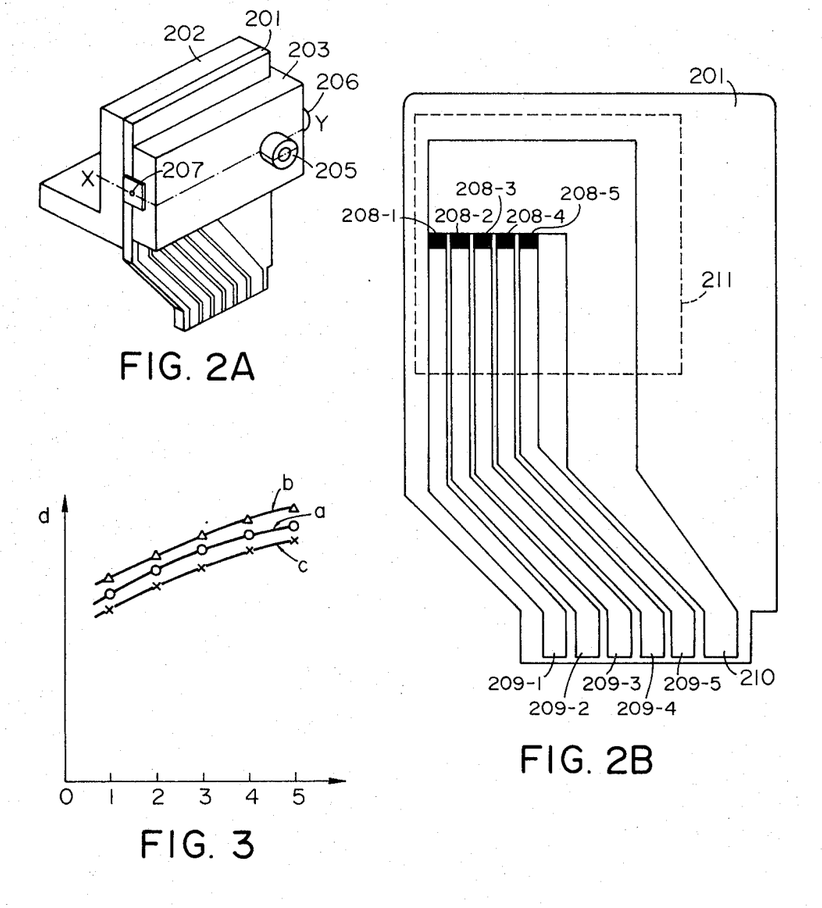
FIG. 2A is a diagrammatic perspective view showing a device, by which the method of the present invention is effected.
FIG. 2B is a diagrammatic plan view for explaining a heat generating base plate 201 of the present invention shown FIG. 2A.
FIG. 3 is a graphical representation showing experimental results when droplets are discharged from the device as shown in FIGS. 2A-2C.
Figure 2C:
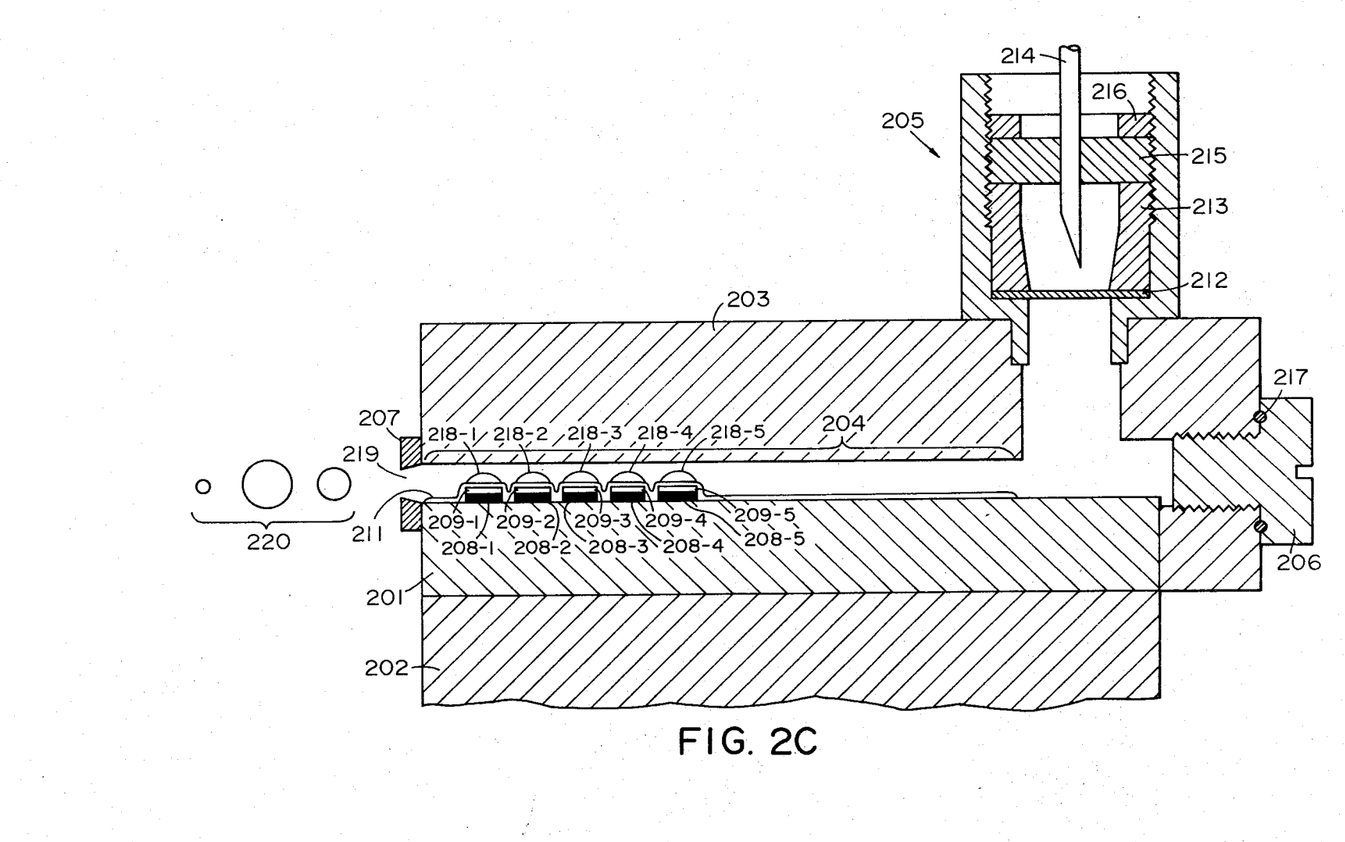
FIG. 2C is a diagrammatic cross-sectional view taken along the broken line X-Y in FIG. 2A.

As shown in FIGS. 2A through 2C, the heat generating base plate 201 including the heat generating body is mounted on a heat sink 202, and its surface is covered with a grooved plate 203, thereby forming a liquid chamber 204 at the junction between the heat generating base plate 201 and the grooved plate 203. On the other hand, the grooved plate 203 is provided with an ink feeding port member 205 to feed the recording liquid (ink) and a stopper 206 intended to facilitate removal of foams and cleaning of the head, particularly, the liquid chamber 204, at the time of the ink feeding. Further, at the tip end of the liquid chamber 204, there is provided an orifice plate 207.

FIG. 2B explains the heat generating base plate 201, on which there is provided a base layer (not shown) intended to secure the temperature and flow rate control characteristics as well as the surface smoothness. On this base layer, there are formed a plurality of heat generating bodies 208-1 through 208-5, a plurality of selection electrodes 209-1 through 209-5, a common electrode 210, and an insulative protective layer 211 shown in broken lines. Explaining one concrete embodiment of such construction, $SiO_2$ is sputtered as the base layer onto the $Al_2O_3$ base plate, followed by lamination of $ZrB_2$ as the heat generating layer and Al as the electrode, after which the heat generating body is formed by a selective photo-etching, and finally $SiO_2$ is again sputtered as the insulative protective layer. The size of the heat generating body, as one example, is 150 μm in length (in the breadthwise direction of the flow path in the liquid chamber) and 200 μm in width (in the discharging direction of the flow path in the liquid chamber).

When a voltage is applied across the selection electrodes 209-1 through 209-5 and the common electrode 210, the heat generating bodies 208-1 through 208-5 become electrically conducted and generate heat.

FIG. 2C is a diagrammatic cross-sectional view taken along the line X-Y in FIG. 2A, which is for explaining the construction and operations of the recording head shown in FIG. 2A, to which the liquid jet recording method of the present invention is applied. The grooved plate 203 is provided therein with fine grooves (in the drawing, they are shown in an exaggerated scale). These grooves form the liquid chamber 204 by joining the grooved plate 203 and the heat generating base plate 201. Further, the liquid feeding port member 205 is provided on one part of the grooved plate 203. In this liquid feeding port member 205, there are provided, as shown in the drawing, a filter 212 having a multitude of fine openings to remove small dusts, etc. in the liquid, a filter holding block 213 to hold the filter 212, a pipe introducing rubber member 215 to hold a pipe 214 for feeding the ink (liquid) from outside, and a holding member 216 for holding the rubber member 215. The grooved plate 203 is further provided with an opening for removing foams and for cleaning the liquid chamber 204 at the time of feeding the ink. The opening is usually closed by an O-ring 217 and a stopper 206. At the tip end of the liquid chamber 204, there is provided an orifice plate 207. This orifice plate 207 is for obtaining droplets in any desired form. This orifice plate 207 is not always necessary where an orifice of a predetermined diameter is provided at the tip end per se of the liquid chamber 204.

As shown exaggeratedly in FIG. 2C, the heat generating bodies 208-1 through 208-5 are arranged in the longitudinal direction (in the direction of the flow path) of the liquid chamber 204, and, upon electric conduction therethrough, they generate heat to cause change in the state of the ink in closer contact with the heat generating bodies. The change in this liquid state involves expansion and vaporization of the liquid, hence it is diagrammatically shown in the drawing by reference numerals 218-1 through 218-5. Generation of foams 218-1 through 218-5 increases the pressure within the liquid chamber 204, and droplets of the ink are discharged from the discharge orifice 219 provided in the orifice plate 207. In addition, by the control as will be described hereinbelow, ink droplets of different diameters are discharged. In case the heat generating bodies 208-1 through 208-5 are made equal in their heat generating area, there occurs change in the total volume of the foams 218-1 through 218-5 generated by changing the number of the heat generating bodies to be electrically conducted, hence the diameter of the droplets discharged. This is resulted from change in the total surface area (total heat generating area) of the heat generating bodies due to the number of such heat generating bodies to be electrically conducted with the consequence that the total volume of the foams 218-1 through 218-5 changes. This could be verified from experiments, wherein a plurality of heat generating bodies of different heat generating surface areas are arranged in the lengthwise direction of the liquid chamber (in the direction of the flow path) and electric current is caused to pass therethrough selectively. In other words, when the heat generating bodies having different heat generating surface areas are formed on the heat generating base plate, and are subjected to selective electric conduction, it is verified that the diameter of the droplets discharged differs.

FIG. 3 shows experimental results on the relationship between the number of the heat generating bodies to be driven, when the droplet discharge is performed in the manner as mentioned in the foregoing, and the diameter of the discharged droplets. As shown in this graphical representation, a curve a is obtained when plotting is done by taking the droplet diameter on the ordinate and the number of the heat generating bodies to be driven on the abscissa; a curve b is obtained when the pulse width and/or pulse amplitude is taken large to augment the thermal energy; and a curve c shows the characteristic at the minimum required thermal energy to obtain the droplet discharge. The number of the heat generating bodies taken on the abscissa signifies the total heat generating area of the heat generating bodies.

In the following, explanations will be given as to exemplary methods of driving the heat generating body in the liquid jet recording method according to the present invention.

Figure 4:
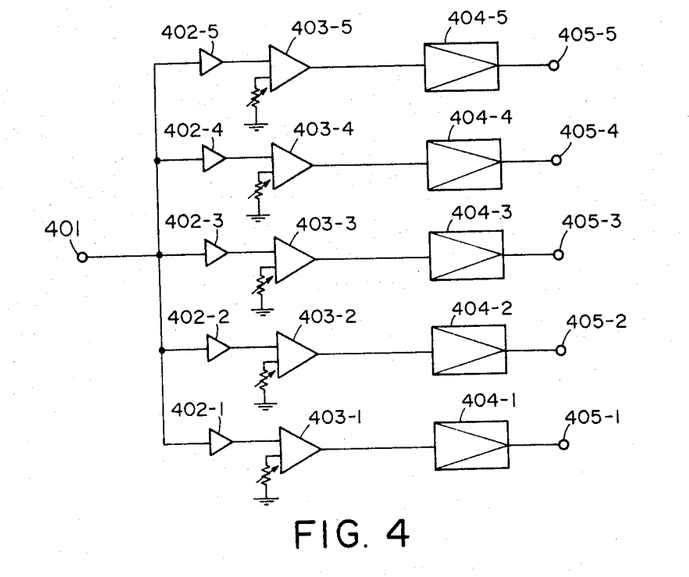
FIGS. 4, 5 and 6 are respectively block diagrams showing preferred embodiments of driving circuit to realize the present invention.

FIG. 4 is a block diagram showing a control circuit to drive the liquid by varying the number of the heat generating bodies to be driven. An input signal from an input terminal 401 is led to comparators 403-1 through 403-5 through buffer circuits 402-1 through 402-5 respectively corresponding to the comparators. The comparator 403-1 produces an output with the lowest input signal level, while the comparator 403-5 produces an output with the highest input signal level. An output signal from each of the comparators 403-1 through 403-5 enters each of drive circuits 404-1 through 404-5. Each of these drive circuits 404-1 through 404-5 is so set that an output signal of a desired pulse width and pulse amplitude may be produced therefrom. A voltage or current from each of the drive circuits 404-1 through 404-5 as an output signal is fed to each of the heat generating bodies through each of the selection electrodes which is connected with each of the corresponding output terminals 405-1 through 405-5, thereby driving the heat generating bodies. Now, if the pulse width and the pulse amplitude in the drives circuits 404-1 through 404-5 are all equal, an output signal is produced from the terminal 405-1 alone with a low level input signal, while the terminals 405-1 through 405-5 are all conductive with a high level input signal. As the consequence, the numbers of the heat generating bodies to be driven change in accordance with the input signal level.

Larger variations in the droplet diameter can be obtained when the drive circuits 404-1 through 404-5 are so adjusted that the pulse width and the pulse amplitude may become larger in the sequence of the first drive circuit to the fifth drive circuit.

Figure 5:
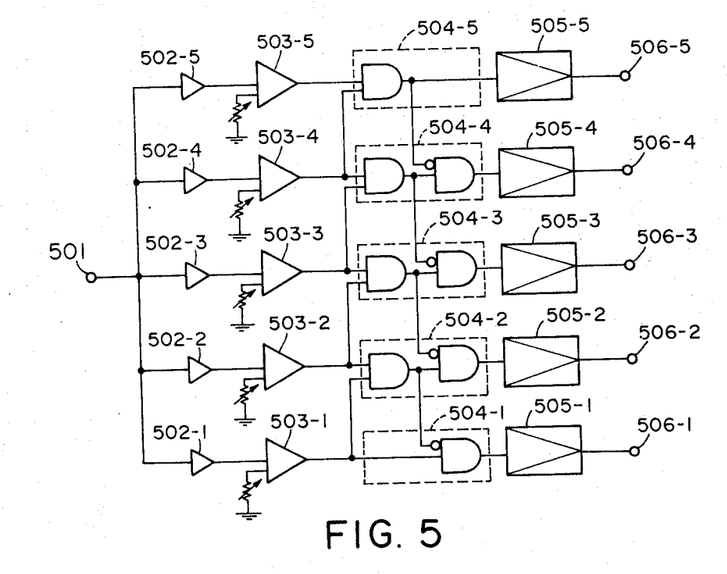

The second method of driving the heat generating body will now be explained in reference to FIG. 5 which is block diagram showing the control circuit to be used for selectively driving the heat generating bodies when the heat generating area of each of a plurality of the heat generating bodies is different. In other words, a drive signal of the heat generator body is produced from any one of the terminals 506-1 through 506-5 in accordance with the input signal level. The comparators 503-1 through 503-5 and the gate circuits 504-1 through 504-5 are for this purpose.

For example, if it is assumed that, in the heat wherein the heat generating surface area of each of the heat generating bodies is formed in different size, the terminal 506-1 is connected with the heat generating body having the smallest heat generating surface area, and the terminal 506-5 is connected with the heat generating body having the largest heat generating surface area, each of the heat generating bodies is selectively driven in accordance with an input signal level into an input terminal 501. Incidentally, in FIG. 5, 502-1 through 502-5 designate buffer circuits, 505-1 through 505-5 drive circuits, all of which have the same functions as those shown in FIG. 4.

Either of the above-explained two driving methods have been explained with a case of using an analog input signal, but they do not require the comparators in the construction, wherein a digital signal is introduced as an input. In this case, the drive circuits receive the gate in accordance with the signal to be selected and driven.

The liquid jet recording method according to the present invention can also be put into practice by differentiating the resistance value of each of a plurality of heat generating bodies to be provided. In more detail, in this embodiment, the five heat generating bodies 208-1 through 208-5 are formed with their electrical resistance values being differentiated, whereby the amount of thermal energy to be generated from each of the heat generating bodies differs, even when an input signal of the same level are introduced. As the result, by selecting the heat generating body to be driven in accordance with the input signal, the diameter of the liquid droplets to be discharged can be controlled. In order to form the heat generating bodies 208-1 through 208-5, each having different resistance value, there may be practiced, for example, one method, in which the film thickness of the heat generating body 208-1 is made the thickest, while the heat generating body 208-5 is made the thinnest so that the thickness becomes gradually thinner from 208-1 toward 208-5, and these heat generating bodies are arranged along the flow path of the liquid chamber 204 in the sequence of from the lowest resistance value (208-1) to the highest resistance value (208-5). By selective passage of electric current through the plurality of heat generating bodies thus formed, thermal energy in inverse proportion to the resistance value is applied to the recording liquid in the liquid chamber 204, foams of a size corresponding to the thermal energy are developed in the recording liquid, and the droplets of a diameter in accordance with the size of the foams are discharged and spattered from the discharge orifice 219.

In the following, explanations will be made as to the driving method for the heat generating bodies provided along the flow passage in the liquid chamber 204 and each having different resistance value.

Figure 6:
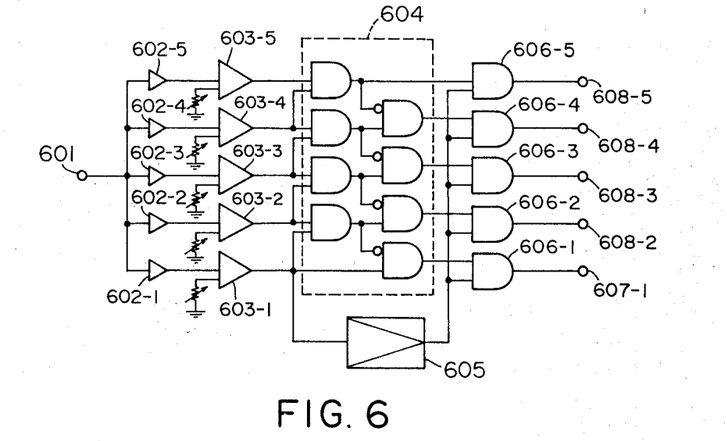

FIG. 6 is a block diagram showing the control circuit for selectively driving the heat generating bodies. Analog input signals entered from an input terminal 601 are led to the comparators 603-1 to 603-5 through the buffer circuits 602-1 through 602-5. The comparator 603-1 is brought to a state, wherein it produces an output signal with the lowest input signal level. The other comparators from 603-2 to 603-5 are brought to their state, wherein they produce sequentially higher level of output signal, as the input signal level becomes higher. Accordingly, the comparators 603-1 through 603-5 are brought to their conductive state in accordance with the input signal level to each of them. In other words, the comparator 603-1 alone becomes conductive with the input signal of the lowest level, while the comparators 603-1 through 603-5 are all conductive with the maximum input signal level. These signals are operated and selected in the gate selection circuit 604 as to which level of the input signal they have been, and render conductive any one of the switching circuits 606-1 through 606-5.

On the other hand, when the input signal of the lowest signal level, for example, is present in the pulse driving circuit 605, an output signal is produced from the comparator 603-1, whereby an output of a desired pulse width and a pulse amplitude is introduced as an input into the switching circuit 606-1. Those of the switching circuits 606-1 through 606-5 which have been selected by the gate selection circuit 604 become conductive and transmit an output from the pulse driving circuit 605 to any one of the output terminals 607-1 through 607-5. Accordingly, if it is assumed that the heat generating body of the thinnest film thickness, i.e., the highest resistance value, is connected to the terminal 607-1, and the heat generating body of the thickest film thickness, i.e., the lowest resistance value, is connected to the terminal 607-5, the heat generating body having the highest resistance value is driven at the low input level in accordance with the input signal level, while the heat generating body of the lowest resistance value is driven at the lowest resistance value.

In the above explanations, a case of using analog signal as an input signal has been described. However, when adopting such a construction that a digital input signal showing the signal level is used, the comparator becomes unnecessary, whereby the gate circuit is selected in accordance with the input digital signal and the heat generating body corresponding to the selected gate circuit is selectively driven. Also, in the above explanations, difference in the resistance value has been explained in terms of the film thickness. It should, however, be noted that the heat generating bodies of different resistance values may be formed with different kinds of resistance material.

In the foregoing explanations of the embodiment, recording operations have been done by controlling the thermal energy to be generated by selecting the heat generating bodies of different resistance values, and changing the droplets to be discharged. Still another different embodiment will be explained in the following.

Figure 7A:
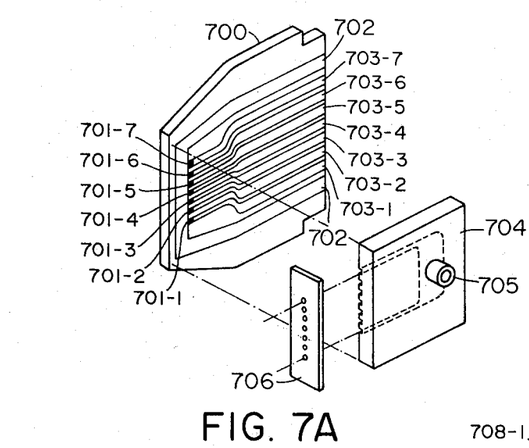
Figure 7B:
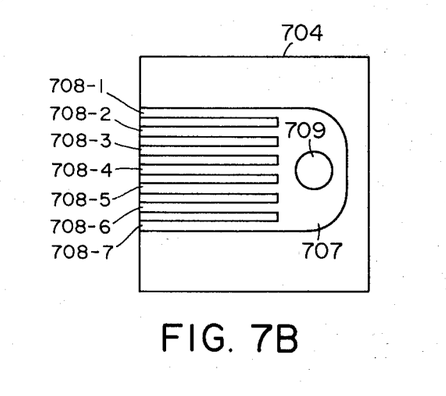
Figure 8:
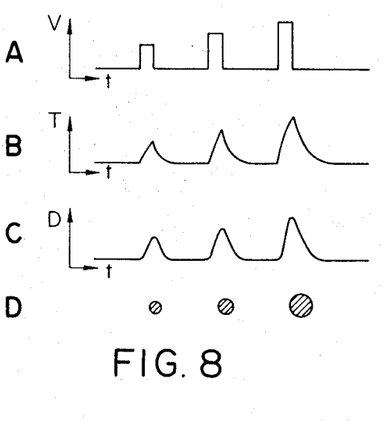
FIGS. 8 and 9 are respectively timing charts for explaining the principle of driving when the device of FIGS. 7A and 7B is used for the recording.
Figure 9:
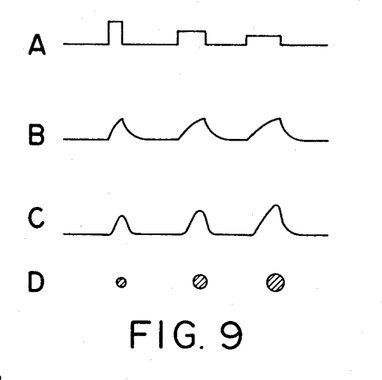

FIGS. 7 to 9 show another embodiment of the present invention, in which the discharge orifice to be provided is in a plurality of numbers.

FIG. 7A is an exploded, perspective view for explaining the overall construction of the recording head. In FIG. 7B, the surface of the heat generating base plate 700 is formed therein with the heat generating bodies 701-1 through 701-7, the common electrode 702, and the selection electrodes 703-1 through 703-7 as is the case with the previous embodiments. A point of difference in this embodiment from the previous embodiment is that the plurality of the heat generating bodies 701-1 through 701-7 have the same area and resistance value, and a single heat generating body is correspondingly provided to a single liquid chamber to be described later. The heat generating base plate 700 is further covered with the grooved plate 704 to form a plurality of liquid chambers at the junction of the heat generating base plate 700. On the other hand, the grooved plate 704 is provided with an ink feeding tube 705 for supplying ink to the liquid chambers, and further a common ink feeding groove 707 to feed ink to each of fine grooves 708-1 through 708-7 which form the abovementioned liquid chambers. At one end of the heat generating base plate 700 and the groove plate 704, there is provided an orifice plate 707.

Now, the groove plate 704 will be explained in detail in reference to FIG. 7B. The grooved plate 704 is composed of glass and other similar material, in which a common ink feeding groove 707 is formed by etching, and a plurality of grooves 708 to be the liquid chambers are formed in the same manner. A hole 709 is for feeding ink therethrough from outside, to which an ink feeding tube 705 is connected. The grooved plate 704 having the grooves 708-1 through 708-7 are connected with the heat generating base plate 700 to form a plurality of liquid chambers. In other words, the grooves 708-1 through 708-7 are so formed as to be corresponding to each of the corresponding heat generating bodies.

Each of the heat generating bodies 701-1 through 701-7 is selected and driven by presence or absence of an input signal from outside. The energy to be applied at the time of driving the heat generating body differs depending on the level of the input signal. The control method therefore is the same as the heat generating bodies 701-1 through 701-7, hence the following explanation will be made only directing to a certain heat generating body alone.

First of all, when a voltage having same pulse width, but different pulse amplitude is sequentially applied to the heat generating body 701, the droplet diameter to be discharged becomes larger with increase in the pulse amplitude. On the other hand, when a voltage is applied to the heat generating body in such a manner that its pulse width may differ, the droplet diameter to be discharged becomes also larger with increase in the pulse width, even when the peak temperature of the heat generating body 701 is constant.

The following explanations in reference to FIGS. 8 and 9 are for the case where the recording operations are actually performed by the above-described control methods. FIG. 8 is an explanatory diagram of a case where the amplitude of a signal to drive the heat generating body is varied, in which (A) shows a pulse waveform of a signal to be applied to the heat generating body; (B) shows a temperature on the surface of the heat generation body; (C) shows a volume of the foams developed in the liquid chambers filled therein with the recording liquid; and (D) shows magnitude or size of the recorded dot corresponding to the droplet diameter in each case.

As shown in FIG. 8, as the amplitude of the signal pulse becomes larger, the surface temperature of the heat generating body becomes high with the result that the volume of the foams to be formed becomes also large and the size of the droplets to be discharged becomes larger accordingly.

FIG. 9 is for explaining the case where the pulse width is varied, in which (A) shows a pulse waveform of the signal; (B) shows a surface temperature of the heat generating body; (C) shows a volume of the foams developed; and (D) shows largeness of the droplets to be discharged.

As shown in FIG. 9, when the heat generating resistive body is driven by so setting the pulse amplitude that the maximum value of the surface temperature may become equal as the signal pulse width is varied, it has been found out that, as the pulse width is larger, the volume of the foams becomes larger, in accordance with which the diameter of the discharged droplet becomes large.

Still another embodiment of the present invention will be explained hereinbelow in reference to FIGS. 10 to 13.

Figure 10A:
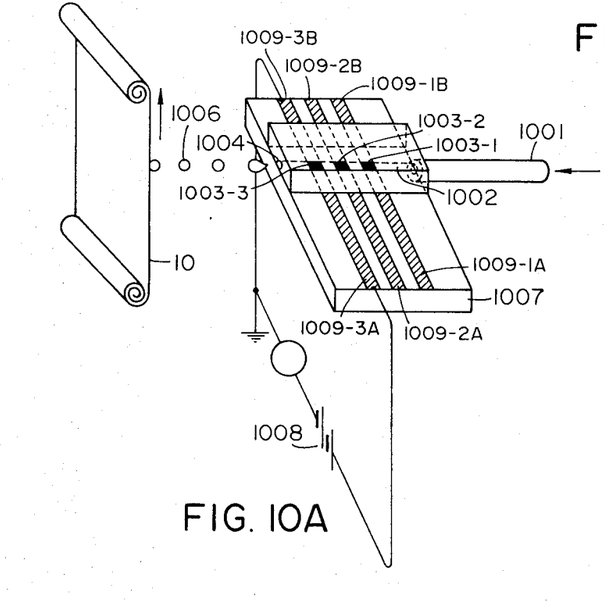

The liquid jet recording head constituting the recording device shown in FIG. 10A is provided with three heat generating bodies along the flow path of the liquid chamber. These three heat generating bodies are sequentially driven from the innermost part of the flow path to thereby perform the droplet discharge. That is, the recording liquid introduced from an ink introducing pipe 1001 into the liquid chamber 1002 is subjected to its instantaneous change in its state, i.e., liquid expansion or vaporization, by the sequential driving of the heat generating bodies 1003-1, 1003-2 and 1003-3 to pulsively emit heat.

With this change in the liquid state, droplets 1006 are discharged and spattered from the orifice 1004. The heat generating body 1003 is provided on the base plate 1007, and a voltage is applied thereto through the electrodes 1009-A and 1009-B by closure of a power source 1008 in accordance with the recording input, whereby they generate heat.

Figure 10B:
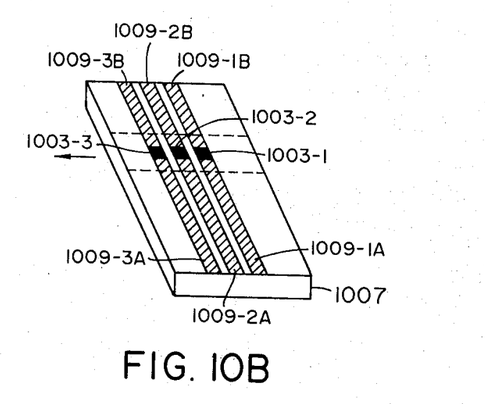

FIG. 10B diagrammatically shows a pattern of the heat generating body 1003 provided on the base plate 1007. In the illustration, there are provided a plurality of heat generating bodies 1003-1, 1003-2 and 1003-3 along the liquid chamber. By applying an input signal to these heat generating bodies 1003-1, 1003-2 and 1003-3 with sequential displacement of the phase from the farthest point away from the orifice to the nearest point thereto, it becomes possible to effectively utilize the motive force due to occurrence of the change in the state of the recording liquid as the discharging force, thereby attaining the energy saving. At the same time, shock wave (the so-called "back wave") caused by abrupt change in the state to the ink feeding tube 1001 is reduced to thereby quickly perform replenishment of the recording liquid into the liquid chamber 1002. As the consequence, the power supply to the heat generating body 1003 is reduced, whereby the power supply can be done below the critical temperature for heat-resistance of the heat generating body 1003, and, at the same time, the cycle of the heat generating body 1003 for its heat generation and cooling is shortened to enable the high speed recording to be realized. Furthermore, the stable discharge of the droplets becomes possible in a region where the heat generating temperature of the heat generating body 1003 is low, so that the service life of the heat generating body 1003, hence the device as a whole, can be prolonged.

Figure 10C:
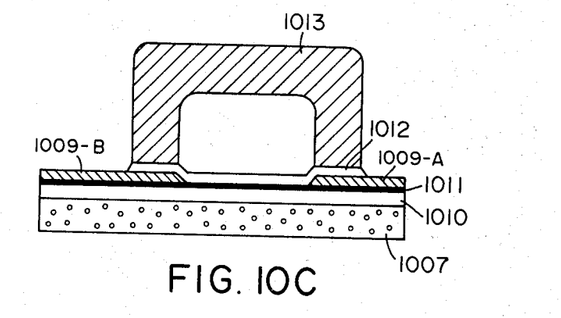

FIG. 10C is a longitudinal cross-section vertically cut along the liquid chamber groove at the portion of the heat generating body 1003 in FIG. 10A. This corresponds to the structure of an embodiment to be described later.

Figure 11:
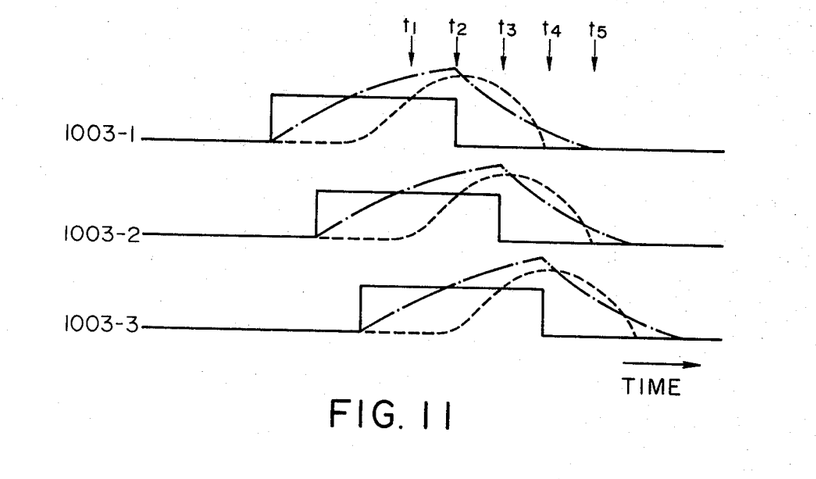
FIG. 11 is an input timing chart for an input signal into the heat generating bodies 1003-1, 1003-2 and 1003-3.

FIG. 11 is one example of an input timing chart for input signals into the heat generating bodies 1003-1, 1003-2 and 1003-3. In this timing chart, the solid lines indicate signal pulses to be applied to the heat generating bodies, the dot-and-dash lines indicate temperature variations in the heat generating bodies, and the dash lines indicates chloronological changes in volume of the foams developed by the action of the thermal energy.

Figure 12:
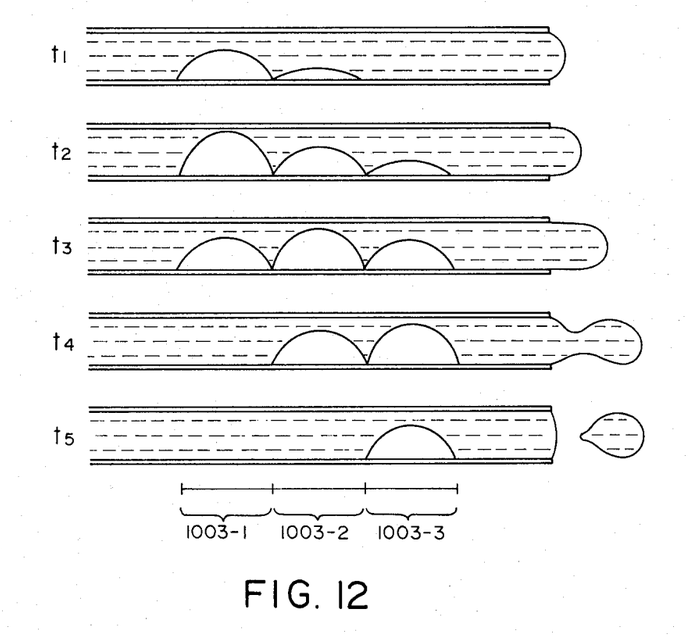
FIG. 12 is a diagrammatic explanatory view showing various states of droplet discharge during a time period of from $t_1$ to $t_5$.
Figure 13:
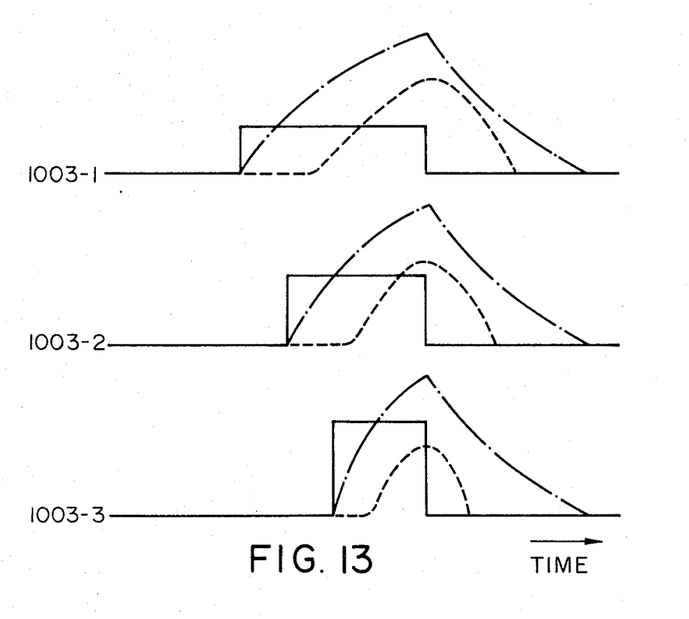
FIG. 13 indicates different input timing charts for an input signal into the heat generating bodies 1003-1, 1003-2 and 1003-3.

FIG. 12 is a diagrammatic representation of the changing volumes of the foams developed at the portion of each heat generating body during a period of from $t_1$ to $t_5$ in FIG. 11. It will be understood from this illustration how the recording liquid in the liquid chamber 1002 is pushed out of the orifice by application of a signal pulse to each of the heat generating bodies with its phase being displaced. It will also be understood from this illustration that the backward influence of the shock wave due to change in the state of the liquid which occurs by heat generation in the heat generating bodies 1003-2 and 1003-3 at the time instant $t_2$ is relaxed by the change in the state of the liquid in the heat generating body 1003-1, and how the recording liquid is smoothly replenished into the liquid chamber 1002 in the sequence of a certain portion in the heat generating body 1003-1 and a certain portion in the heat generating body 1003-2.

FIG. 11 shows a state, wherein signal pulses of the same level are sequentially supplied to each of the heat generating bodies with the input timing thereof alone being displaced, although this signal pulse application to the heat generating body may be done by changing the level of the signal pulse. It should also be noted that the number of the heat generating body is not limited to three, but any desired number may be disposed along the liquid chamber, and the input signal pulses are sequentially applied from the innermost part thereof.

In the following, explanations will be given as to one example, wherein actual recording operation is performed by manufacturing the recording head of the same construction as shown in FIG. 10.

Onto an alumina base plate 1007 of 1 mm thick, there was sputtered an $SiO_2$ layer 1010 as a heat resistance coating to a thickness of 4 μm, a $ZrB_2$ layer 1011 as a heat generating layer to a thickness of 600 Å, and aluminum layers 1009-A and 1009-B as the electrodes to a thickness of 5,000 Å in lamination. Thereafter, three heat generating bodies of a size of 200 μm×200 μm were arranged with a space interval of 50 μm by means of the selective photo-etching operation.

Subsequently, $SiO_2$ was sputtered onto the heat generating body 1003 as a protective coating 1012 to a thickness of 0.5 μm, thereby completing the heat generating base plate. In the next step, a grooved plate 1013 having a groove of 300 μm in width and 150 μm in depth was adhered to the heat generating body 1003 in such a manner that the groove may cover the heat generating body, followed by connection of an ink introducing tube 1001 at the rear side of the groove.

Incidentally, the resistance value of the three heat generating bodies 1003-1, 1003-2 and 1003-3 are all 100 ohms. Then, a rectangular voltage of a pulse width of 20 μs at 25 V, a rectangular voltage of 15 μs at 30 V, and a rectangular voltage of 10 μs at 35 V were sequentially applied to the heat generating bodies from the farthest one as viewed from the orifice with a spatial displacement of 5 μs.

According to this example, stable droplet discharge could be attained up to 100 μs of a pulse cycle.

Next, the rectangular voltage of 20 μs to 10 μs were simultaneously applied to these three heat generating bodies 1003-1, 1003-2 and 1003-3 in a range of 25 to 35 V, and then compared with the example, in which the phase difference in the signal pulse were provided. It was found out that, in the case of the simultaneous application, the droplet discharge became unstable at the pulse cycle of 200 μs, and no droplet discharge could be realized at the pulse cycle of 100 μs. With the power consumption at the same frequency, the former was found to be always less.

Incidentally, for the recording liquid (or ink), the following compositions were mixed and dissolved, followed by filtration through a filter.

| | |
|---|---|
| toluene | 70 (gr) |
| Ethylene glycol | 28 (gr) |
| Oil Black HBB | 2 (gr) |
| (produced by Orient | |

-continued

| |
|---|
| Chemical Co.) |

What is claimed is:

1. A liquid jet recording method, which comprises:
controlling thermal energy quantity to be generated by driving predetermined numbers of heat generating bodies selected in accordance with recording informations from a plurality of heat generating bodies which are arranged along flow path in a liquid chamber communicatively connected with a discharge orifice for discharging and spattering liquid droplets in a predetermined direction, and each being driven independently of the other;
causing said controlled thermal energy to act on the liquid in said liquid chamber to bring about instantaneous change in the state of the liquid to develop foams; and
discharging and spattering the liquid droplets from said discharge orifice for recording.

2. The liquid jet recording method as set forth in claim 1, wherein said liquid chamber is provided in a plurality of numbers, each being in a thin, rectilinear shape, arranged in parallel to each other, and communicatively connected with a common liquid feeding chamber.

3. A liquid jet recording method, which comprises:
controlling thermal energy quantity to be generated by driving one heat generating body selected in accordance with recording informations from a plurality of heat generating bodies which are arranged along flow path in a liquid chamber communicatively connected with a discharge orifice for discharging and spattering liquid droplets in a predetermined direction, and each being driven independently of the other;
causing said controlled thermal energy to act on the liquid in said liquid chamber to bring about instantaneous change in the state of the liquid to develop foams; and
discharging and spattering the liquid droplets from said discharge orifice for recording.

4. The liquid jet recording method as set forth in claim 3, wherein said liquid chamber is provided in a plurality of numbers, each being in a thin, rectilinear shape, arranged in parallel each other, and communicatively connected with a common liquid feeding chamber.

5. A liquid jet recording method, which comprises:
introducing an input signal, the energy level of which has been selected in accordance with recording informations, into at least one heat generating body provided along a flow path in a liquid chamber communicatively connected with a discharge orifice for discharging and spattering liquid droplets in a predetermined direction,
controlling thermal energy quantity generated from said heat generating body;
causing said controlled thermal energy to heat the liquid in said liquid chamber to bring about instantaneous change in the state of the liquid to develop foams; and
discharging and spattering the liquid droplets from said discharge orifice for recording.

6. The liquid jet recording method as set forth in claim 5, wherein said liquid chamber is provided in a plurality of numbers, each being in a thin, rectilinear shape, arranged in parallel each other, and communicatively connected with a common liquid feeding chamber.

7. A liquid jet recording method, which comprises:
causing thermal energy generated by driving a plurality of heat generating bodies which are arranged along flow path in a liquid chamber communicatively connected with a discharge orifice for discharging and spattering liquid droplets in a predetermined direction, and each being driven independently of the other, in the sequence of the innermost part of said flow path to bring about instantaneous change in the state of the liquid to develop foams; and discharging and spattering the liquid droplets from said discharge orifice for recording.

8. The liquid jet recording method as set forth in claim 7, wherein said liquid chamber is in a thin, rectilinear shape.

* * * * *

UNITED STATES PATENT AND TRADEMARK OFFICE
CERTIFICATE OF CORRECTION

PATENT NO.   :   4,251,824

DATED        :   February 17, 1981

INVENTOR(S)  :   TOSHITAMI HARA, et al.

It is certified that error appears in the above-identified patent and that said Letters Patent are hereby corrected as shown below:

Column 1, line 31, change "satisfactorily" to --sufficiently--;

line 52, change "on" to --an--;

line 59, change "repreducibility" to --reproducibility--.

Column 2, line 51, change "other" to --another--.

Column 3, line 15, after "respectively" insert --a--;

line 24, change "other" to --another--;

line 67, change "is acted onto" to --acts on--.

Column 4, line 65, change "conducted" to --conductive--.

Column 7, line 18, change "are" to --is--.

UNITED STATES PATENT AND TRADEMARK OFFICE
CERTIFICATE OF CORRECTION

PATENT NO. : 4,251,824
DATED : February 17, 1981
INVENTOR(S) : TOSHITAMI HARA, et al.

It is certified that error appears in the above-identified patent and that said Letters Patent are hereby corrected as shown below:

Column 8, line 64, change "groove" to --grooved--.

Column 12, line 47, after "parallel" insert --with--.

Signed and Sealed this

Fifth Day of May 1981

[SEAL]

Attest:

RENE D. TEGTMEYER

Attesting Officer     Acting Commissioner of Patents and Trademarks